United States Patent [19]

Ohmura

[11] Patent Number: 5,400,250

[45] Date of Patent: Mar. 21, 1995

[54] REAR WHEEL STEERING DEVICE

[75] Inventor: Hiroshi Ohmura, Hatsukaichi, Japan

[73] Assignee: Mazda Motor Corporation, Hiroshima, Japan

[21] Appl. No.: 910,493

[22] Filed: Jul. 8, 1992

[30] Foreign Application Priority Data

Jul. 10, 1991 [JP] Japan .................................. 3-170051

[51] Int. Cl.⁶ ........................ B60G 17/00; B62D 5/30
[52] U.S. Cl. ........................... 364/424.05; 364/424.03; 180/141; 180/79.1
[58] Field of Search ....................... 364/424.05, 424.03; 180/140, 141, 143, 154, 79.1, 197; 280/91, 772, 775

[56] References Cited

U.S. PATENT DOCUMENTS

| 4,937,748 | 6/1990 | Yonekawa et al. | 364/424.05 |
| 5,018,070 | 5/1991 | Eguchi | 364/424.05 |
| 5,020,619 | 6/1991 | Kanazawa et al. | 180/140 |
| 5,032,997 | 7/1991 | Kawagoe | 364/424.05 |
| 5,076,597 | 12/1991 | Korekane et al. | 280/91 |
| 5,101,922 | 4/1992 | Ohmura | 180/79.1 |
| 5,105,899 | 4/1992 | Mori et al. | 180/140 |
| 5,189,616 | 2/1993 | Tsurumiya et al. | 364/424.05 |

FOREIGN PATENT DOCUMENTS

| 289039 | 11/1988 | European Pat. Off. . |
| 398381 | 11/1990 | European Pat. Off. . |
| 2-85074 | 3/1990 | Japan . |
| 2-43674 | 10/1990 | Japan . |
| 3-271073 | 12/1991 | Japan . |
| 2170453 | 8/1986 | United Kingdom . |

Primary Examiner—Kevin J. Teska
Assistant Examiner—Tan Nguyen
Attorney, Agent, or Firm—Keck, Mahin & Cate

[57] ABSTRACT

A rear wheel is provided with a steering characteristic such that a vehicle runs on a cornering path with a longitudinal center line of the vehicle substantially aligned with a tangential line of the cornering path throughout cornering movement. A fail judge device is provided for judging when a rear wheel steering device failure is present in light of a criterion based on a rear wheel steering. A criterion change device is also provided for changing the criterion between a transitional cornering condition, in which the vehicle is in an initial stage of a cornering movement just after a steering operation and before a cornering force acting on the vehicle body reaches a substantial value, and a steady cornering condition, in which the cornering force has reached the substantial value. A reverse phase control can be properly performed without failure judgment. This assures that a desirable driving feeling is provided for the driver when cornering as well as improved safety.

11 Claims, 8 Drawing Sheets

REAR WHEEL STEERING DEVICE

BACKGROUND OF THE INVENTION

1. Field of the Invention

The present invention relates to a rear wheel steering device in which a rear wheel is steered in accordance with a front wheel.

2. Description of the Related Art

As commonly known, a so called 4 wheel steering (4WS) vehicle is provided with a rear wheel steering device for steering the rear wheel in accordance with a steering wheel operation as well as a front wheel steering device.

In the rear wheel steering device, it has been generally proposed that the rear wheel be steered in the opposite direction to the front wheel when the vehicle speed is lower than a predetermined value (speed responsive type) or when the steering angle for the front wheel is greater than a predetermined value (steering angle responsive type).

In the 4WS vehicle, the rear wheel steering characteristic is determined so as not to produce so called head-in and head-out of the vehicle in which the vehicle head portion significantly comes off from the turning path of the vehicle. In other words, the rear wheel steering characteristic is determined such that a longitudinal center line of the vehicle moves along a tangential line of the cornering path of the vehicle wherein a vehicle body slip angle $\beta$ is zero.

A conventional rear wheel steering device can provide a cornering characteristic in which vehicle body slip angle $\beta$ is zero in a steady cornering condition after a steering operation. When the driver operates the steering wheel for cornering, the vehicle experiences a transitional cornering condition just after the steering operation by the driver before the vehicle reaches the steady cornering condition. In the transitional cornering condition, the vehicle is not subjected to a side force high enough to cause the vehicle body to be moved substantially perpendicular to the tangential line of the cornering path.

Thus, the vehicle moves obliquely from the tangential line of the cornering path at the initial stage of the cornering movement. This affects the driving feeling of the driver badly.

In view of this, it has been proposed that the rear wheel be steered in a direction opposite to the front wheels (reverse phase control) for a moment just after the steering operation by the driver. This facilitates a responsive yawing of the vehicle and produces a proper cornering force even in the initial stage of the cornering movement. Therefore, it is possible for the vehicle to move along the cornering path in the transitional condition as well as the steady cornering condition.

Meanwhile, it has been proposed that the 4WS be provided with a fail safe system in which an abnormality is detected when a steering ratio of the rear wheel to the front wheel is increased beyond a predetermined zone; such a system is proposed in Japanese Patent Publication No. 2-43674. The fail safe system functions to detect the abnormality of the rear steering device quickly to improve the safety of the 4WS vehicle, for example by switching from the 4WS condition to 2WS condition.

In the conventional fail safe system for the rear wheel steering device, generally, the rear wheel steering is prohibited in the direction opposite to the front wheel when the vehicle speed is relatively high or when the steering angle of the front wheel is relatively small. On the other hand, under the reverse phase control, the rear wheel steering in the opposite direction to the front wheel steering is prohibited irrespective of the vehicle speed and the front wheel steering angle as far as the vehicle is in the transitional cornering condition which occurs for a certain period just after the steering operation is made. Therefore, where the rear wheel steering device is provided with both the conventional fail safe system as mentioned above and the reverse phase control system, there is a fear that the fail safe system will detect erroneously an abnormality of the rear wheel steering device when the rear wheel is steered in the direction opposite to the front wheel in accordance with the reverse phase control.

SUMMARY OF THE INVENTION

It is therefore an object of the present invention to provide a rear wheel steering device which enables the vehicle to run on a cornering path in a manner such that the longitudinal center line of the vehicle is aligned with the tangential line of the cornering path in the transitional cornering condition as well as the steady cornering condition.

Another object of the present invention is to improve the safety of the rear wheel steering system.

Still another object of the present invention is to prevent misjudgment of abnormality of the rear wheel steering device, in particular, when the vehicle is in the transitional cornering condition.

The above and other objects of the present invention can be accomplished by a rear wheel steering device providing a rear wheel with such a steering characteristic that the vehicle runs on a cornering path in such a manner that a longitudinal center line of the vehicle is aligned with the tangential line of the cornering path throughout the cornering movement. The rear wheel steering device comprises fail judge means for judging the rear wheel steering device failure in light of a criterion based on a rear wheel steering and criterion change means for changing the criterion between a transitional cornering condition where the vehicle is in an initial stage of a cornering movement just after a steering operation and before a cornering force acting on vehicle body reaches a substantial value and a steady cornering condition where the cornering force has reached the substantial value.

In a preferred embodiment, the criterion change means loosens the criterion in the transitional cornering condition as compared with the steady cornering condition.

In another embodiment, the fail judge means is provided with maps which provide the criteria for the transitional and steady cornering conditions wherein the judge means judges the rear wheel steering device failure when the rear wheel steering angle is increased beyond a predetermined zone based on the map, the predetermined zone defined by the map for the transitional cornering condition being greater than that defined by the other map for the steady cornering condition.

In a still further embodiment, the fail judge means is provided with a criterion under which the failure of the rear wheel steering device is judged when the rear wheel steering angle is increased beyond a predetermined zone. Processing means defines the predetermined zone for the transitional and steady cornering condition. The predetermined zone in the transitional cornering condition is greater than that in the steady cornering condition.

In further embodiment, the fail judge means is provided with first and second allowable zones as criteria for judging failure of the rear wheel steering device. The fail judge means judges the failure of the rear wheel steering device when the rear wheel steering angle gets out of the first allowable zone for a predetermined time period while it also judges the failure as soon as the rear wheel steering angle gets out of the second allowable zone. The second allowable zone is determined to be greater than the first allowable zone.

The criterion may be determined based on the vehicle speed in addition to the rear wheel steering, such as steering angle, steering speed and the like.

According to the above features of the present invention, the abnormality of the rear wheel steering device can be quickly and properly found based on the fail safe system having a properly determined criterion for the failure of the rear wheel steering device.

In particular, when the vehicle is in the transitional cornering condition, the criterion is loosened as compared with the steady cornering condition so that the reverse phase control can be properly performed without failure judgment. This assures that a desirable driving feeling is provided for the driver when cornering as well as improving safety.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 1:
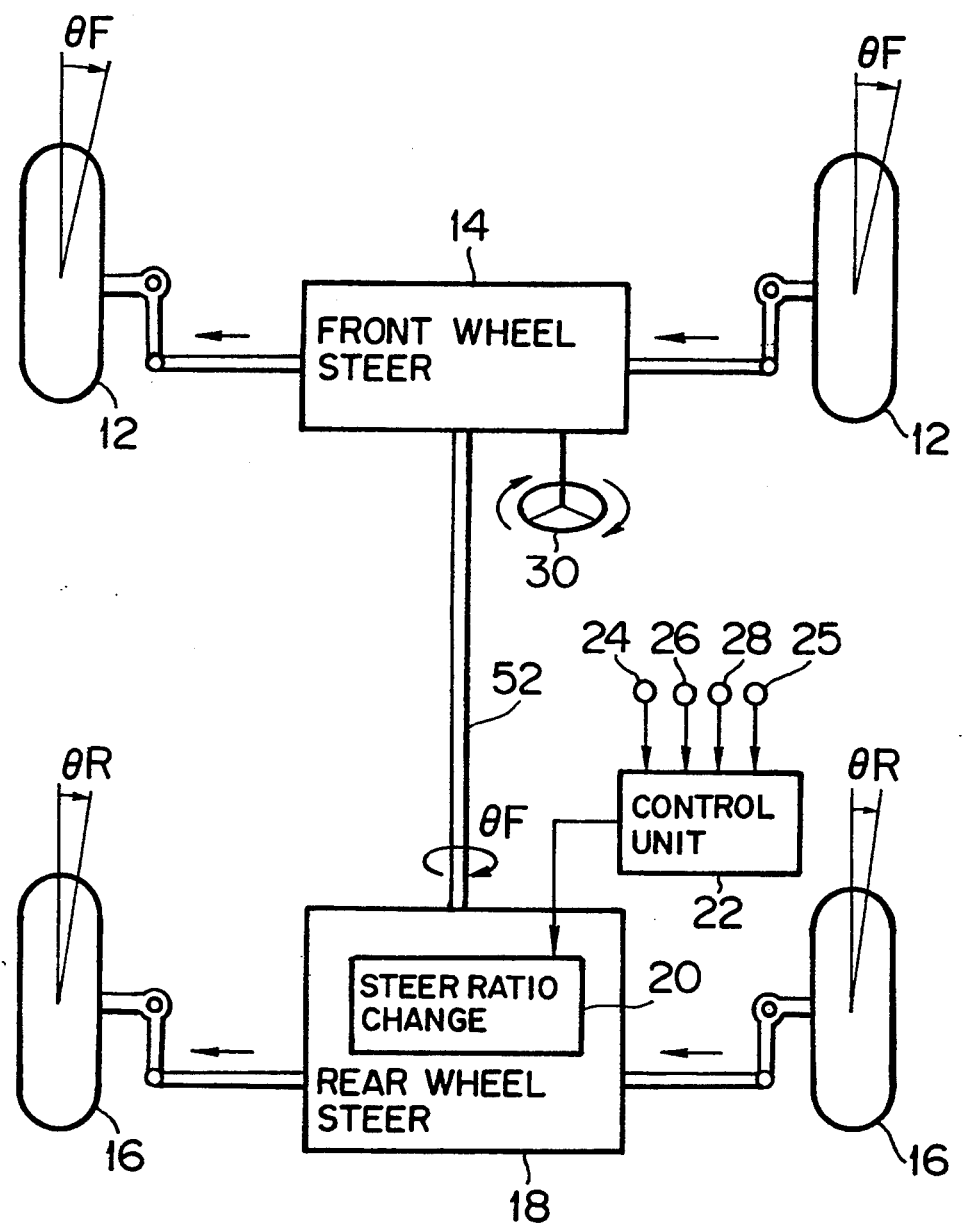
FIG. 1 is a schematic view of a vehicle to which a rear wheel steering device in accordance with the present invention can be applied.

Referring to FIG. 1, a vehicle is provided with right and left front wheels 12, right and left rear wheels 16 and front steering device 14 to which the front wheels 12 are connected. A steering wheel 30 is connected with the front wheel steering device 14 to steer the front wheels 12 which produces a steering angle $\theta F$. The rear wheels 16 are connected with a rear wheel steering mechanism 18 to be steered which produces a steering angle $\theta R$. The front and rear steering devices 16 and 18 are mechanically connected with each other through an intermediate shaft 52 to which the front wheel steering angle $\theta F$ is transmitted. The front wheel steering angle $\theta F$ is transmitted to the rear wheel steering mechanism 18 through a steering ratio change mechanism 20 with a given steering ratio $\theta S$ ($\theta R/\theta F$). When the steering ratio change mechanism 20 changes the steering ratio $\theta S$, the rear wheel steering angle $\theta R$ is changed even when the front wheel steering ratio $\theta F$ is constant.

The illustrated steering ratio change mechanism 20 is controlled by control unit 22 which is constituted typically to include a micro computer.

The control unit 22 determines a target steering angle of the rear wheel based on the steering ratio $\theta S$ and carries out a feedback control to converge the actual rear wheel steering angle $\theta R$ to the target steering angle based on the output of a steering ratio sensor 28 utilizing the steering ratio change mechanism 20.

Figure 2:
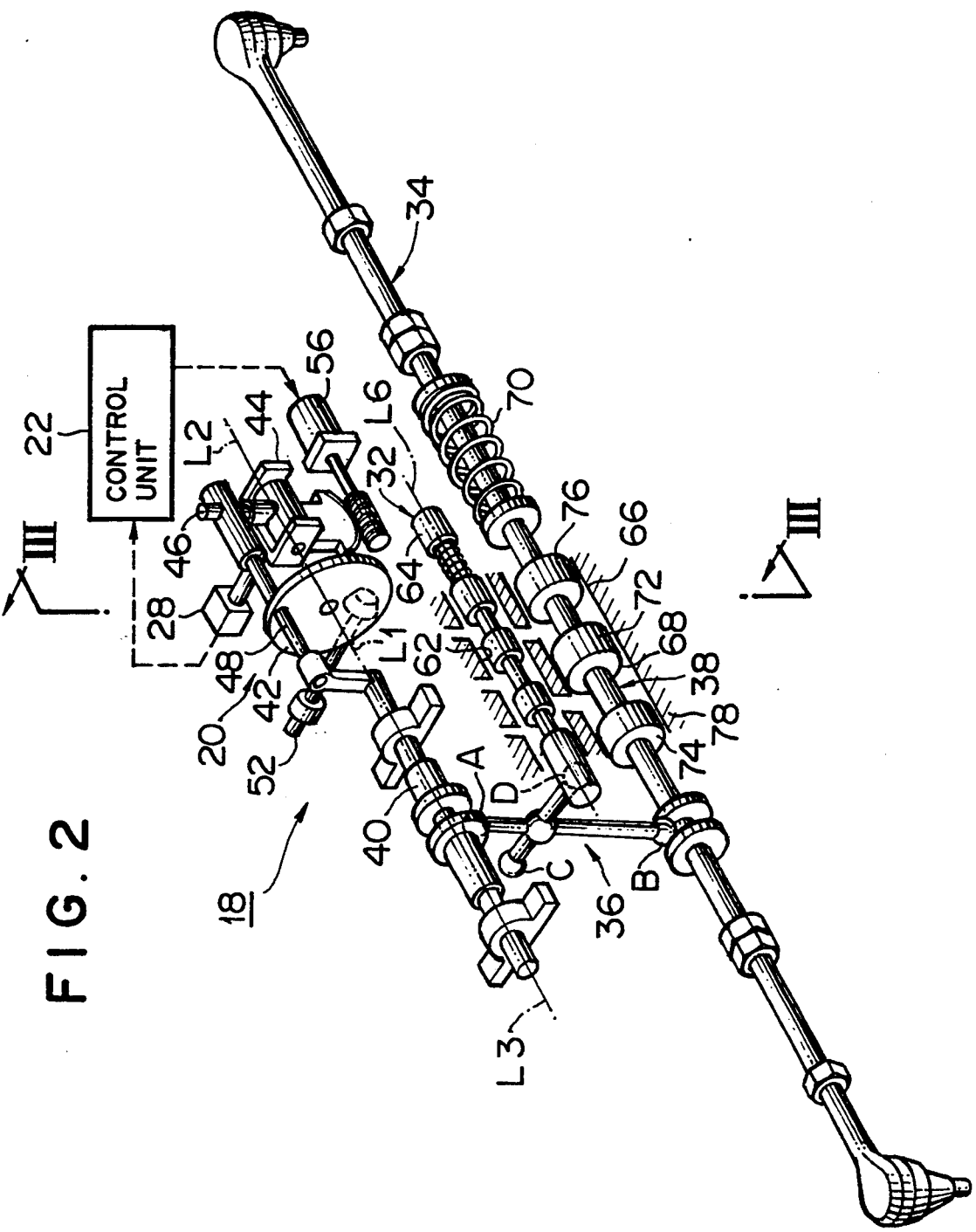
FIG. 2 is a perspective view showing details of the rear wheel steering device and steering ratio change mechanism.

As shown in FIG. 2, the rear wheel steering mechanism 18 includes the steering ratio change mechanism 20, hydraulic switching valve 32, rear wheel steering rod 34, displacement transmitting means 36 and hydraulic power cylinder 38.

Figure 3:
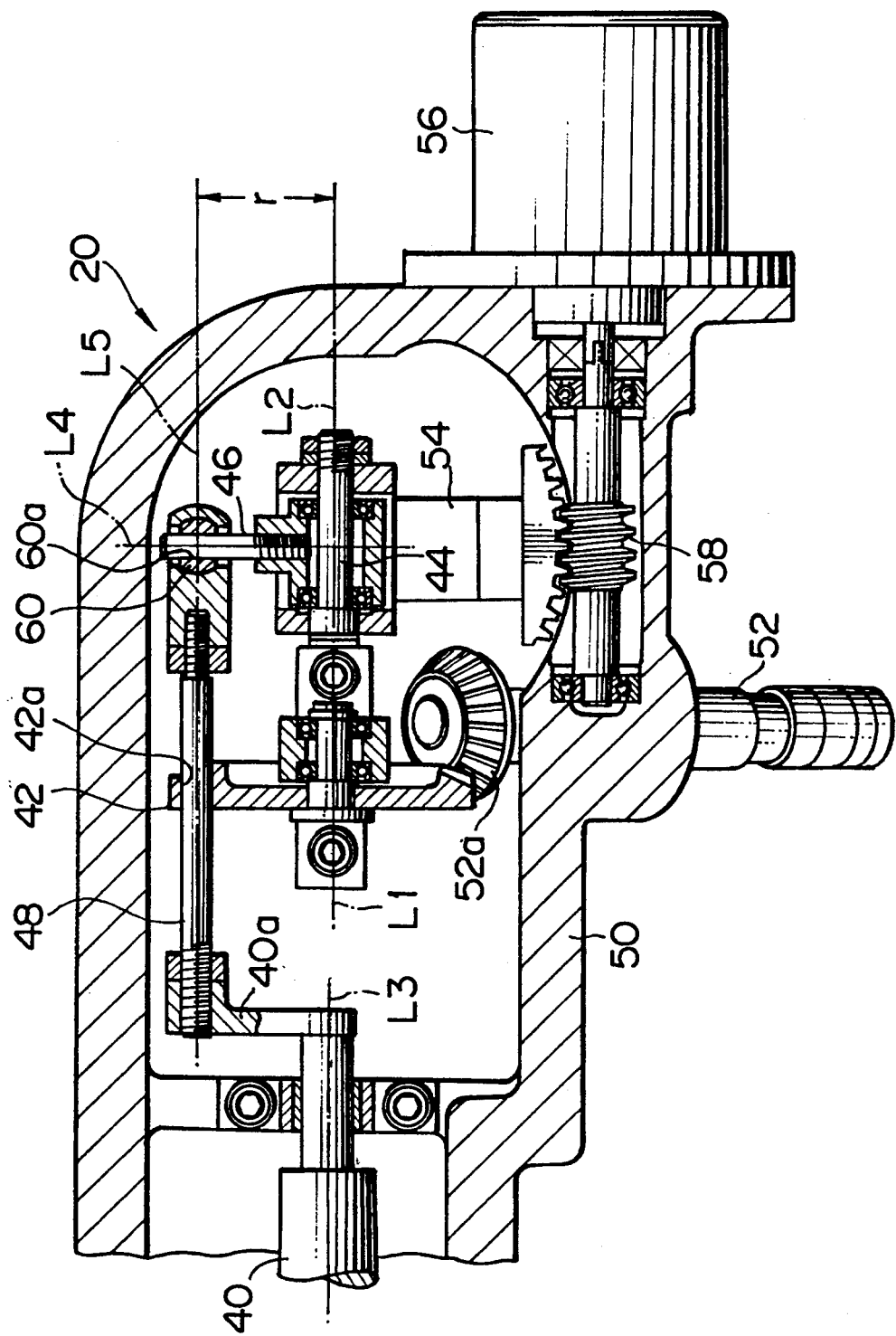
FIG. 3 is a sectional view taken along a line III—III in FIG. 2.

The steering ratio change mechanism 20 is provided with output rod 40, bevel gear 42, swingable shaft member 44, swing arm 46 and connecting rod 48 which are arranged in the case 50 as shown in FIG. 3. The output rod 40 is slidably mounted on the case in its axial direction L3 to displace the steering rod 34 in the axial direction through the displacement transmitting means 36. Thus, the rear wheels 16 which are connected with opposite ends respectively are steered.

The bevel gear 42 is rotatably mounted on the case 50 with axis L1 on the same line as the axis L3. When the steering wheel is operated, a pinion 52a which is located at a rear end of the shaft 52 and meshed with the bevel gear 42 is rotated so that the bevel gear 42 is rotated with the axis L1. Thus, the front wheel steering angle $\theta F$ is transmitted to the rear wheel steering mechanism 18 through the transmitting shaft 52.

The shaft member 44 with its axis L2 on the same line as the axis L3 is fixed on the swing gear 54. The swing gear 54 is meshed with worm gear 58 which is driven by servo motor 56 controlled by the control unit 22. The swing gear 54 swings with a swing axis perpendicular to a plane including the axis L2 and crossing the axis L2 so that the swingable shaft member 44 is swung as well.

The swing arm 46 is swingably connected to the shaft member 44 with the axis L2 wherein axis L4 of the swing arm 46 passes the cross point of the swing axis of the shaft member 44 and the axis L2.

The connecting rod 48 with axis L5 in parallel with the axis L3 of the output rod 40 is connected with the output rod 40, bevel gear 42 and swing arm 46. One end of the connecting rod 48 is formed with a threaded portion through which the rod 48 is joined with a lever 40a which is mounted on one end of the output rod 40. The connecting rod 48 extends through a hole 42a formed on the bevel gear 42 at a distance r from its axis L1. The other end of the connecting rod 48 is provided with a ball joint 60 which allows a rotational movement in any direction. The swing arm 46 is inserted into a hole 60a formed on the ball joint 60 so that the other end of the connecting rod 48 is engaged with the swing arm 46.

Thus, the connecting rod is fixed to the output rod 40 but can be swung with regard to the bevel gear 42 in the direction of the axis L5 (L3) and with regard to the swing arm 46 in the direction of axis L4 (perpendicular to the axis L3 in the illustrated condition). When the shaft member 44 swings, the axis L4 of the swing arm 46 is inclined. However, the swing shaft 46 can be swung with the inclined attitude by virtue of the ball joint 60 to transmit the movement to the connecting rod 48. Thus, the swing arm 46 is connected with the connecting rod 48 allowing a relative movement thereof in the direction perpendicular to the axis L3. As the swing arm 46 swings, the locus of the connecting point between the swing arm 46 and the connecting rod is a part of a circle or ellipse with a radius r and a center on the axis L3.

Figure 4:
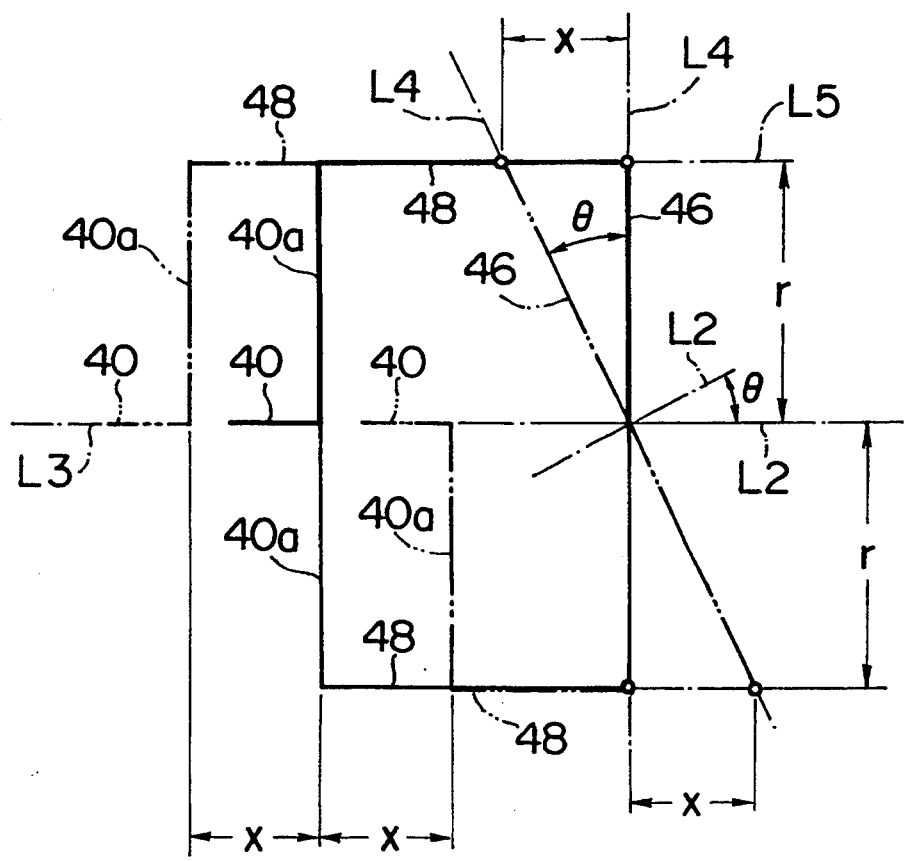
FIG. 4 is a conceptional view for explaining an operational principle of the present invention.

FIG. 4 shows a displacement of the output rod 40 when the axis L2 of the swingable shaft member 44 is inclined by angle $\theta$ from the axis L3 of the output rod 40 or, in other words, when the axis L4 of the swing arm is swung by the angle $\theta$ from the direction perpendicular to the axis L3. As seen from the drawing, the displacement of the connecting point between the swing arm 46 and the connecting rod 48 takes the same value X in the direction of the axis L3 irrespective of the swinging direction of the swing arm 46 as long as the swinging amount is the same. Thus, the displacement of the output rod 40 is the same value X since the output rod 40 is fixed with the connecting rod 48.

As aforementioned, the displacement of the output rod 40 in the right and left direction takes the same value X as long as the swinging amount of the swing arm 46 is the same. However, the value X will change depending on the angle $\theta$ even when the rotation amount of the bevel gear and steering amount of the steering wheel are the same.

Therefore, the steering ratio $\theta S$, which is defined as a ratio of rear wheel steering angle $\theta R$ to front wheel steering angle $\theta F$ ($\theta R/\theta F$), can be changed by changing the inclination angle $\theta$ of the swing arm 46 which can be controlled by the servo motor 56.

Further, the swingable shaft member 44 can be inclined in the clockwise direction as well as the counterclockwise direction. When the shaft member 44 is inclined in the clockwise direction, the output rod 40 is displaced in the opposite direction to that shown in FIG. 4. This means that the rear wheel can be steered in the opposite direction to that of the front wheel (reverse phase control) as well as the same direction as that of the front wheel (same phase control).

The steering ratio determined or changed by the steering ratio change mechanism is detected by the steering ratio sensor 28 mounted on the swingable shaft 44 based on the inclined angle $\theta$ of the shaft 44.

The switching valve 32 includes valve housing 62 and spool 64 movably disposed in the housing 62 along axis L6 in parallel with the axis L3. The spool 64 is moved by the output rod 40 and the rear wheel steering rod 34 through the transmitting means 36. As the spool is moved, the hydraulic supply for the hydraulic power cylinder is controlled. When the spool 64 is displaced rightward from its neutral position shown in FIG. 2, the hydraulic pressure is introduced into right oil chamber 66 of the cylinder 38. On the other hand, when the spool 64 is displaced in the left direction, the hydraulic pressure is introduced into the left chamber 68.

The steering rod 34 extends and axially displaces in the transverse direction of the vehicle in parallel with the axis L3 by virtue of the hydraulic pressure introduced into the power cylinder 38. The rod 34 is connected with the rear wheels 16 through tie rod and knuckle arm (not shown) to steer them. A centering spring 70 is provided for the rod 34 so as to resiliently place the rod 34 at the neutral position when the system including the valve 32, cylinder 38 and the like malfunctions. This provides a fail safe for the system.

The power cylinder 38, which displaces the steering rod 34 in the transverse direction, is provided with a piston 72 fixed to the rod 34 and partitions 74 and 76 which define the right and left hydraulic chambers 66, 68. The partitions 74, 76 are fixed to housing 78 of the power cylinder 38 and can move slidably relative to the rod 34.

The displacement transmitting means 36 is engaged with the rod 40, spool 64 and the rod 34. When the rod 40 is displaced, the spool 64 is displaced. Displacement of the spool 64 causes the rod 34 to be displaced. Then, the displacement of the rod 34 causes the spool 64 to be displaced in the opposite direction.

The displacement transmitting means 36 in this embodiment is constituted by a cross lever having a vertical lever and horizontal lever. One end A and the other end B of the vertical lever are engaged with the output rod 40 and the steering rod 34 respectively. One end C and the other end D of the horizontal lever are engaged with case of the rear wheel steering device fixed to the body and the spool 64 respectively. The engaging points A, B, C and D are not movable relative to the rod 40, rod 34 and the spool 64 in the axial direction thereof but are movable in the other directions and rotatable with respect to rods 40, 34 and spool 64. The engaging point C is constituted by a ball joint which allows rotational movement but does not allow any displacement. The displacement of the output rod 40 in the direction of the axis L3 causes the rod 34 to be axially displaced through the transmitting means 36 to steer the rear wheels 16 which are connected with opposite ends of the rod 34. Japanese Patent Public Disclosure No. 1-273772, laid open to the public in 1990, discloses a transmitting mechanism of the steering amount.

According to the illustrated embodiment, the steering characteristic of the rear wheel is provided based on the vehicle speed, steering angle of the steering wheel and yawing rate of the vehicle. The control unit 22 receives signals from vehicle speed sensor 24 for detecting the vehicle speed V, steering angle sensor 25 for detecting the steering angle $\theta H$ of the steering wheel and yaw rate sensor 26 for detecting the yawing rate Y.

The steering ratio $\theta S$ as a steering characteristic is provided by the following equation (1).

$$\theta S = C1 + C2 \cdot Y \tag{1}$$

C1 is basic steering characteristic component and C2·Y is yawing rate component.

The component C1 is provided by a function f(V, θH) of the vehicle speed V and the steering angle θH. The component is provided by a function g(V) of the vehicle speed V. Thus, the equation (1) is converted to the following equation (2).

$$\theta S = f(V, \theta H) + g(V) \cdot Y \tag{2}$$

Figure 5:
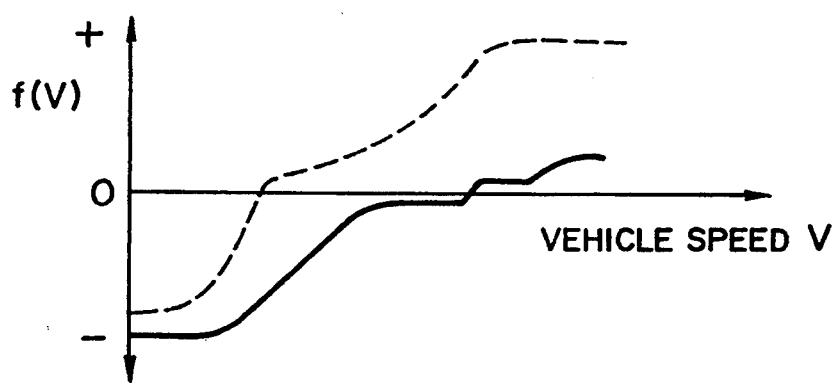
FIG. 5 is a graphical representation of a basic characteristic of a steering component relating to the vehicle speed.
Figure 6:
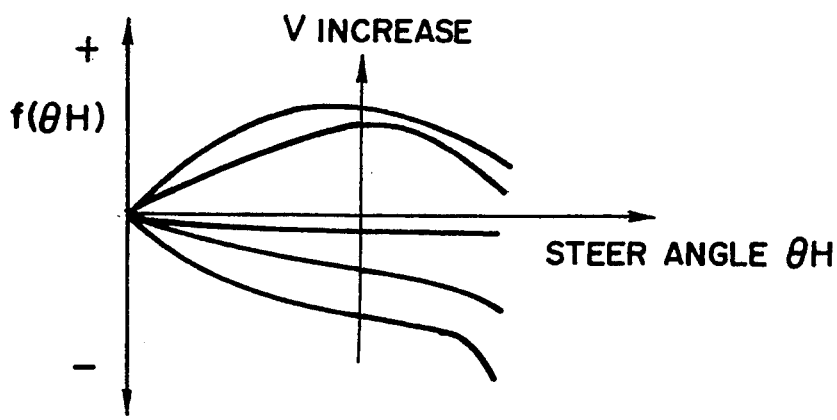
FIG. 6 is a graphical representation of a basic characteristic of a component relating to a steering angle of the steering wheel.
Figure 7:
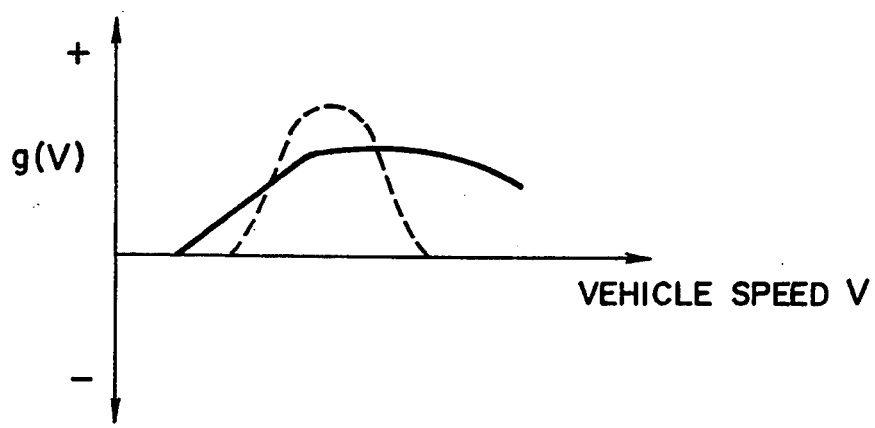
FIG. 7 is a graphical representation of a control gain for a yawing rate component.

With regard to the function f(V, θH), a characteristic of a value f(V) for the vehicle speed V is provided as shown by a real line and broken line in FIG. 5 and a characteristic of a value f(θH) for the steering angle θH is provided as shown in FIG. 6. A characteristic of g(V) is provided as shown in FIG. 7. In this case, characteristics shown by a real line and a broken line in FIG. 7 correspond to the characteristics of real and broken lines of f(V) in FIG. 5 respectively.

Figure 8:
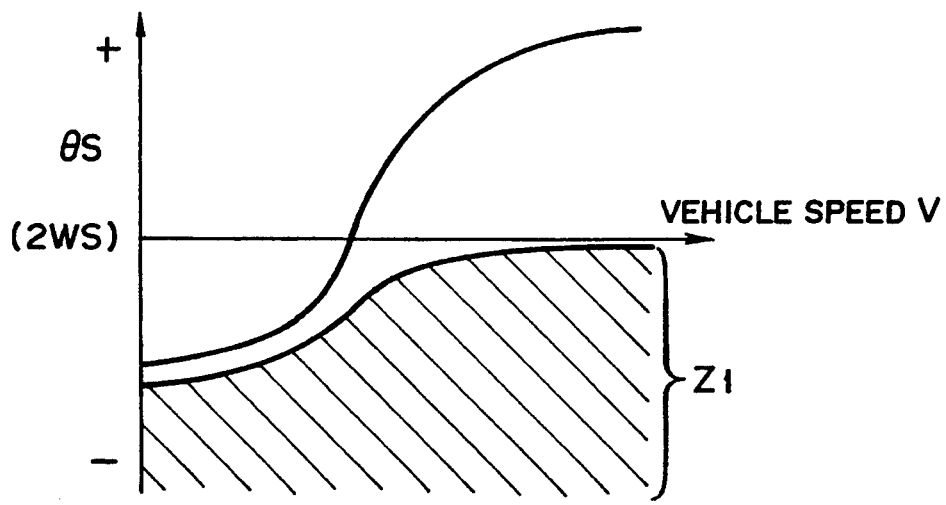
FIG. 8 is a graphical representation showing a characteristic of the steering ratio with respect to the vehicle speed and a fail zone for the steady cornering condition.

FIG. 8 shows a steering ratio characteristic of the rear wheel steering device 10 in response to vehicle speed change. As seen from the drawing, when the vehicle speed is lower than a predetermined value, the steering ratio takes a negative value so that the rear wheel is steered in the direction opposite to the front wheel(reverse phase control). On the other hand, when the vehicle speed is increased beyond the predetermined value, the steering ratio takes a positive value so that the rear wheel is steered in the same direction as the front wheel (same phase control). When the vehicle speed is maintained at just the predetermined value, the rear wheels are not steered so that only the front wheels are steered to take the so called 2WS condition.

According to the illustrated embodiment, fail zone $Z_1$ as shown by hatched portion in FIG. 8 is provided. It is assumed that as far as the rear wheel steering device 10 operates properly, the steering ratio does not take a value within the fail zone $Z_1$. If the actual steering ratio is found to have a value in the fail zone $Z_1$, the control unit 22 judges failure of the rear wheel steering device by means of fail judge section. If the control unit 22 judges the rear wheel steering device failure, a fail safe control is carried out.

According to the illustrated embodiment, this fail zone $Z_1$ is stored in a memory of the control unit 22 as a map 1. The control unit 22 judges whether or not the actual steering ratio θS is in the fail zone $Z_1$ based on the signal from the steering ratio sensor 28. If this judgment is Yes, the control unit 22 holds a failure of the rear wheel steering device 10.

In this case, the hydraulic pressure supply to the rear wheel steering mechanism, for example, is interrupted so that the rear wheel steering rod 34 is returned to the neutral position by virtue of the centering spring 70 to switch to the 2WS condition.

Meanwhile, in the illustrated embodiment, when the vehicle is in a cornering bath, a rear wheel steering characteristic is determined such that the vehicle runs on a cornering path in a manner so that a longitudinal center line of the vehicle is aligned with the tangential line of the cornering path from a transitional cornering condition, in which the vehicle is in an initial stage of a cornering movement just after a steering operation and before a cornering force acting on vehicle body reaches a substantial value, to a steady cornering condition, in which the cornering force has reached the substantial value.

In other words, the rear wheel steering characteristic is determined such that a vehicle body slip angle β is zero throughout the cornering movement. For this purpose, the rear wheels are steered in the opposite direction to the front wheels (reverse phase control) for a moment just after the steering operation is made irrespective of the vehicle speed and the front wheel steering angle.

When the yawing of the vehicle is properly facilitated by virtue of the reverse phase control to accomplish a desirable yawing rate or side acceleration G for the cornering movement, the reverse phase control is stopped and then the rear wheels are steered in accordance with usual rear wheel steering control. The reverse phase control assists in generating responsively a proper yawing cornering force for the vehicle in the transitional cornering condition which occurs just after the steering operation. As a result, the vehicle can keep substantially an attitude of vehicle side slip angle β=0 and can accomplish a stable cornering movement.

Figure 9:
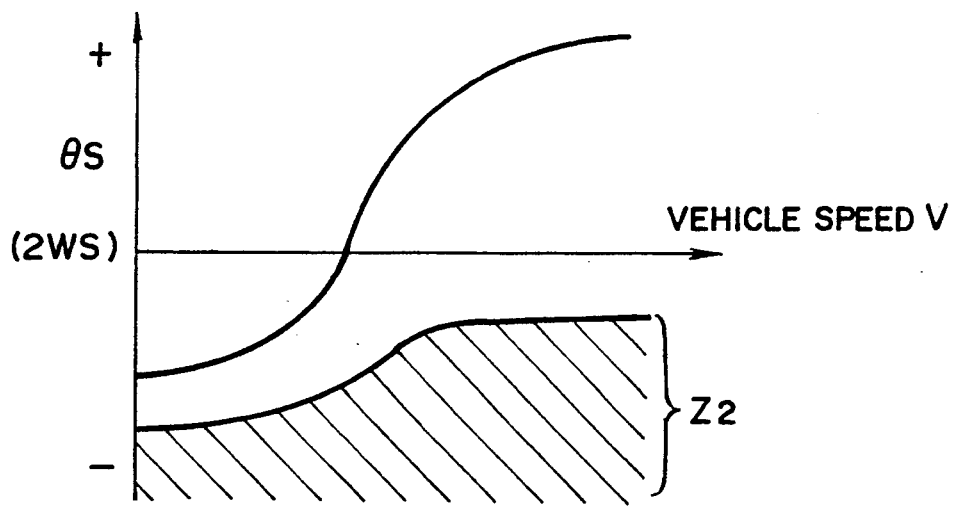
FIG. 9 is a graphical representation of a fail zone for the transitional cornering condition.

The control unit 22 is also provided with another map 2 in which another fail zone $Z_2$ is defined. This map 2 is provided for the transitional cornering condition in which the reverse phase control is carried out. In the illustrated embodiment, in order to prevent a misjudgment of an abnormality of the rear wheel steering device 10 when the reverse phase control is carried out in the transitional cornering condition, the fail zone $Z_2$ in the map 2 as shown in FIG. 9 is smaller than the fail zone $Z_1$ in the map 1. This is because the reverse phase control is made in which the rear wheel is steered in the opposite direction to the front wheel for a moment just after the steering operation is made or in the transitional cornering condition irrespective of the vehicle speed and the steering amount of the front wheels.

The map 2 is stored in the memory of the control unit 22. The control unit 22 switches from the map 1 to map 2 in the transitional cornering condition for judging the abnormality of the rear wheel steering device 10.

Since the map 2 provides loose criterion in judging the abnormality of the rear wheel steering device 10 compared with the map 1, there is no fear that the control unit 22 erroneously holds failure of the rear wheel steering device in the transitional cornering condition in which the reverse phase control is made irrespective of the vehicle speed and the steering amount.

The fail zones $Z_1$ and $Z_2$ are compensated depending on the vehicle speed.

Figure 10:
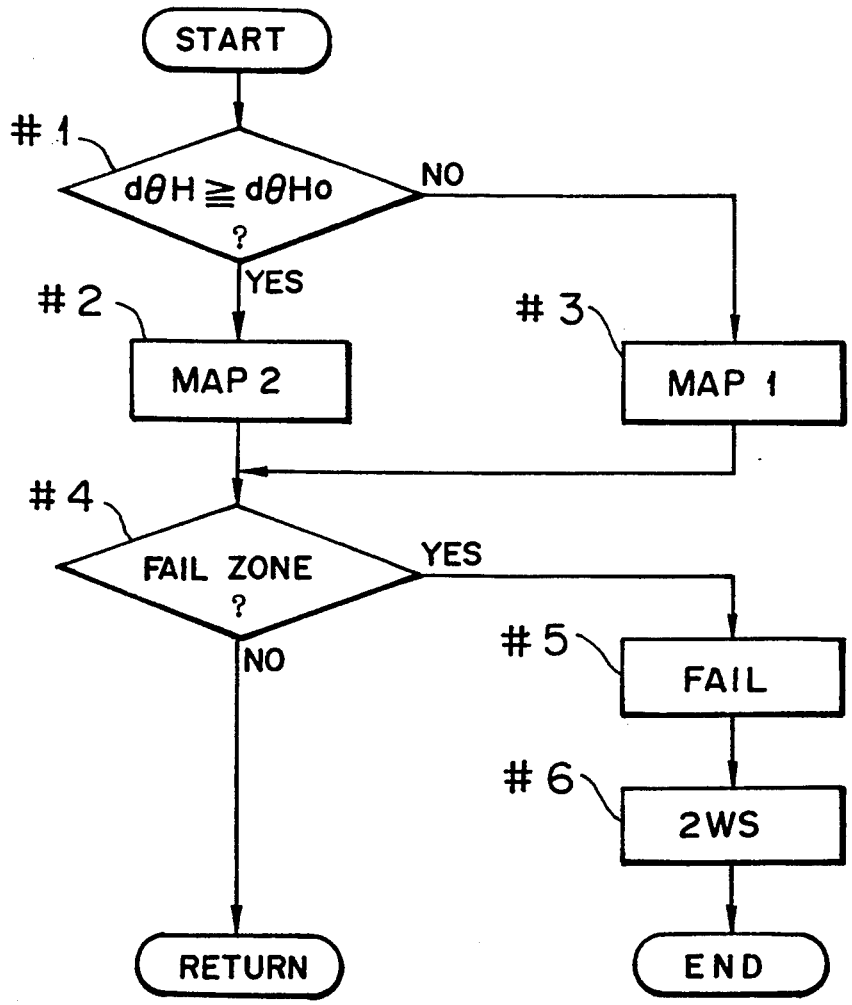
FIG. 10 is a flow chart of a rear wheel steering control of the rear wheel steering device.

Hereinafter, there is described a rear wheel steering control in accordance with the illustrated embodiment of the present invention with reference to a flow chart in FIG. 10.

In step #1, the control unit 22 judges whether or not the vehicle is in the transitional cornering condition. This judgment is made as to whether or not the steering speed of the steering wheel dθH is not smaller than a predetermined value dθH° in the illustrated embodiment. This judgment may be made based on the change rate of the side acceleration G and/or yawing rate Y.

If the judgment is Yes, the map 2 is selected in step #2. If No, the map 1 is selected in step #3. In step #4, it is judged whether or not the steering ratio θS is in the fail zones $Z_1$ or $Z_2$ in each case. If the result is No, the procedure is returned to step #1 and repeated. On the other hand, if the result in step #4 is Yes, the control unit 22 holds that there is abnormality or failure in the rear wheel steering device 10 in step #5. In this case, the control unit 22 switches from the 4WS condition to 2WS condition immediately for the safety of the vehicle.

Thus, when the steering ratio θS is in the fail zones $Z_1$ or $Z_2$, in other words, when the steering ratio θS is out of the allowable zone, the fail judgment is made promptly. In a modified embodiment, the fail zone $Z_2$ is determined to expand the fail zone $Z_1$ by processing in the control unit 22.

Figure 11:
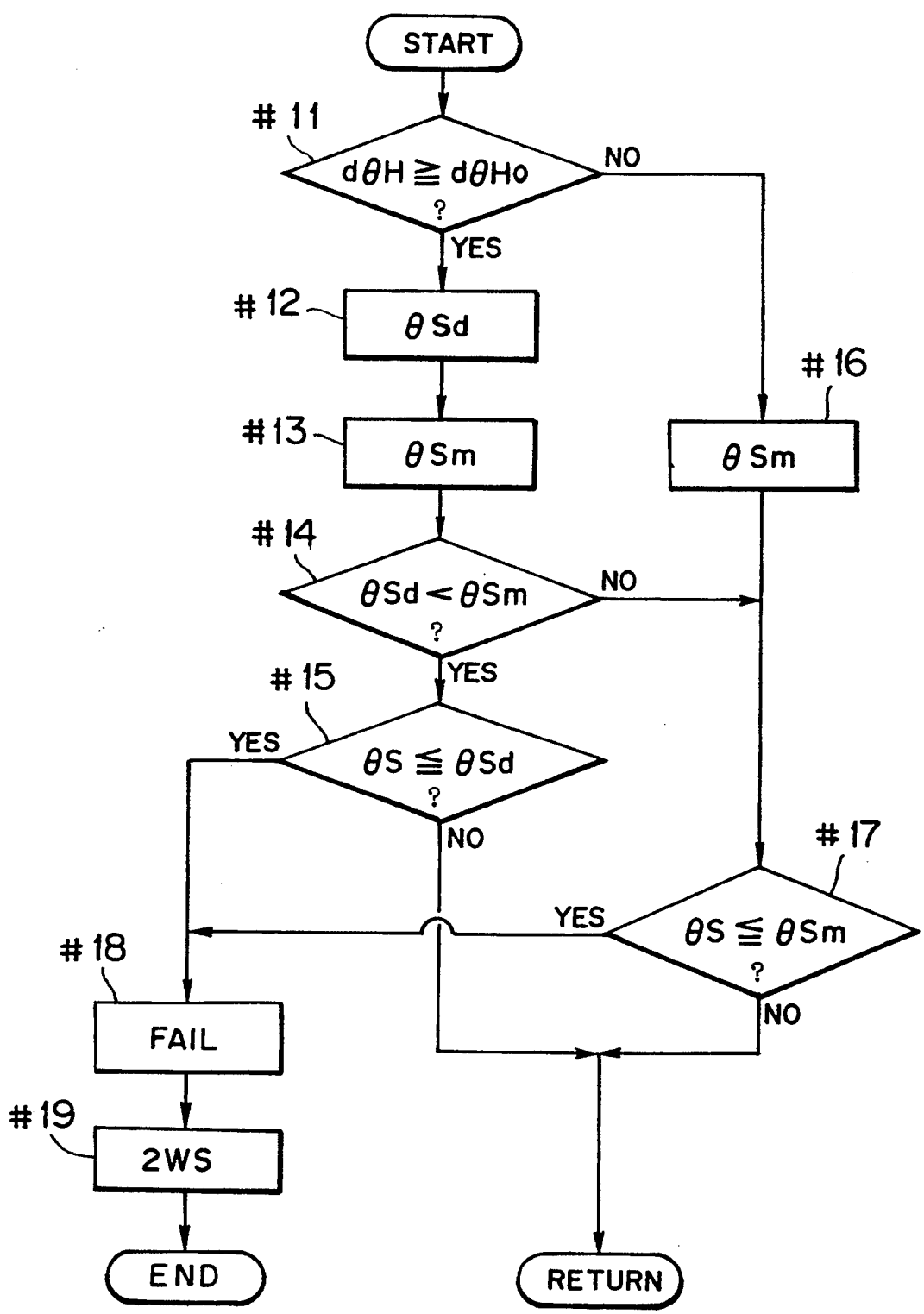
FIG. 11 is a flow chart of a rear wheel steering control in accordance with another embodiment of the present invention.

Another embodiment will explained taking reference with FIG. 11.

The control unit 22 judges whether or not the vehicle is in the transitional cornering condition in step #11 as in the former embodiment. If the result is Yes in step #11, the control unit 22 determines the allowable limit of the steering ratio θSd in the transitional cornering condition in step #12 at a given vehicle speed by calculation.

The limit of the steering ratio θSd is provided by the following equation (3).

$$\theta Sd = -f(V, \theta H) + g(V) \cdot Y - K \quad (3)$$

K is constant. The value θSd takes a minimum value when the yawing rate is zero. When there is no yawing of the vehicle, the rear wheels are steered in the opposite direction to the front wheels with the maximum level. As the yawing rate Y is increased, the steering amount of the rear wheels in the opposite direction is gradually reduced.

The allowable limit θSd in the transitional cornering condition is determined to have a value smaller than the value obtained through the equation (2) by the constant K.

In step #13, the control unit 22 reads the upper limit θSm of the fail zone $Z_1$ of the map 1 for the steady cornering condition. If the judgment in step #11 is No, the control unit 22 reads the value θSm in step #16. In step #14, it is judged whether or not the value θSd is smaller than the value θSm. If the result is Yes, the value θSd is used as a reference value for judging the failure of the rear wheel steering device instead of the value θSm which is the upper limit of the fail zone $Z_1$. The fail judgment is made as to whether or not the actual steering ratio θS is not greater than the value θSd.

On the other hand, if the judgment in step #14 is No, the value θSm is used as the reference value for judging the failure of the rear wheel steering device 10. And in step #17, the steering ratio θS is compared with the value θSm for fail judgment. In step #15 or #17, the judgment is No, this means that the rear wheel steering device 10 is properly operated. In this case, the procedure is returned to step #11 for further control. If the judgment in step #15 or #17 is Yes, the steps #18 and #19, in which the same procedure as in the steps #5 and #6 is carried out, are taken so that the steering system is switched immediately to 2WS condition.

Figure 12:
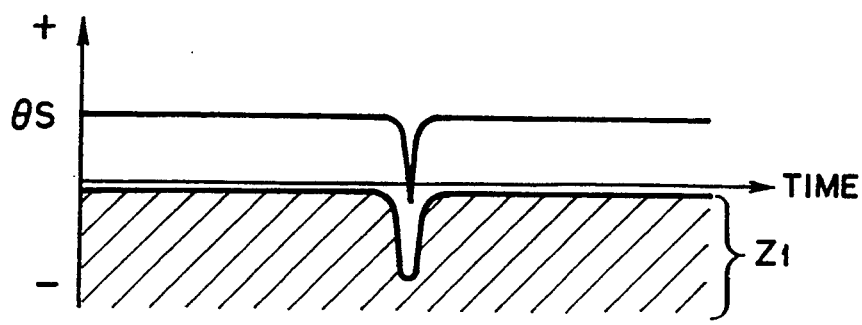
FIG. 12 is a simulated graphical representation for explaining a rear wheel steering control in accordance with the embodiment described in connection with FIG. 11.

As shown in FIG. 12, the fail zone in the steady cornering condition is temporarily canceled in the transitional cornering condition. A different reference value, which is lower by a predetermined value than the one in the steady cornering condition, is provided for the fail judgment in the transitional cornering condition.

Figure 13:
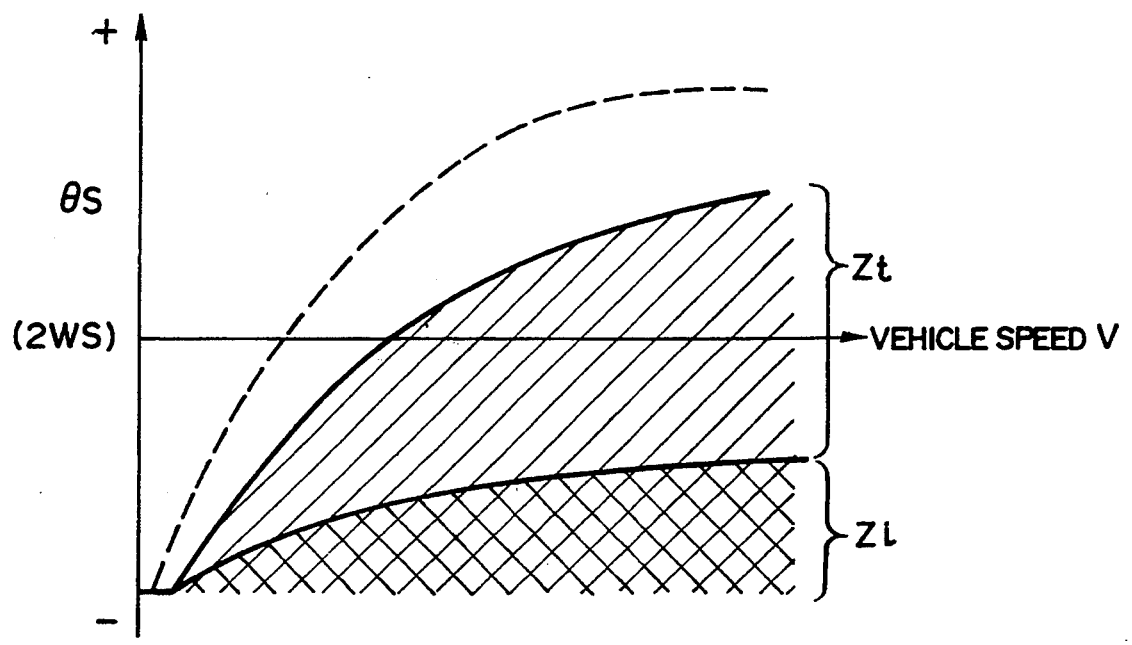
FIG. 13 is a graphical representation of a fail zone of the rear wheel steering device in accordance with still another embodiment.

In still another embodiment, referring to FIG. 13, two different fail zones are provided for the fail judgment. One of the fail zones is a timed fail zone Zt in which the fail holding is not made until a predetermined time period has passed after the actual steering ratio θS falls into the fail zone Zt. The other of the fail zones is an instant fail zone Zi in which the fail holding is made instantly when the actual steering ratio θS falls in the fail zone Zi. The upper limit of the instant fail zone Zi is smaller than that of the timed fail zone Zt. Thus, when the fail judgment is made with regard to the instant fail zone Zi, the allowable zone is broadened relative to the timed fail zone Zt. The predetermined time period for the timed fail zone Zt is determined in such a manner that there is no fear of misjudgment of the failure about the rear wheel steering device even when the reverse phase control is made temporarily in the transitional cornering condition.

The front wheel steering mechanism 14 can be engaged with the rear wheel steering mechanism 18 by means of an electrical device such as a servo motor which controls the rear wheel steering in accordance with the front wheel steering.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A rear wheel steering device for steering a rear wheel so that a vehicle runs on a cornering path with a longitudinal center line of the vehicle substantially aligned with a tangential line of the cornering path throughout cornering comprising:

fail judge means for judging a rear wheel steering device failure based on a predetermined criterion corresponding to a cornering condition related to rear wheel steering;

cornering condition detecting means for detecting, as said cornering condition, at least one of a transitional cornering condition, in which the vehicle is in an initial stage of a cornering movement just after a steering operation and before a cornering force acting on a vehicle body reaches a substantial value, and a steady cornering condition, in which the cornering force has reached the substantial value; and criterion change means for changing said predetermined criterion as a cornering condition detected by said cornering condition detecting means changes between said transitional cornering condition and said steady cornering condition.

2. A rear wheel steering device as recited in claim 1 wherein, when the vehicle is in the transitional cornering condition, the criterion is met more easily than for the steady cornering condition.

3. A rear wheel steering device as recited in claim 2 wherein the cornering condition detecting means detects the transitional cornering condition when a steering speed of a steering wheel is no less than a predetermined value.

4. A rear wheel steering device as recited in claim 1 wherein the fail judge means is provided with maps for the transitional and steady cornering conditions, the fail judge means judges the rear wheel steering device failure when the rear wheel steering angle is increased above a predetermined angle based on one of the maps, and the predetermined angle is defined by a map for the steady cornering condition as being greater than that defined by a map for the transitional cornering condition.

5. A rear wheel steering device as recited in claim 4 wherein the cornering condition is changed based on vehicle speed in addition to the cornering condition related to rear wheel steering.

6. A rear wheel steering device as recited in claim 1 wherein the fail judge means judges a failure of the rear wheel steering device to be present when a rear wheel steering angle is increased beyond a predetermined angle in the transitional cornering condition and a predetermined angle in the steady cornering condition, respectively, the predetermined angle in the steady cornering condition being greater than that in the transitional cornering condition.

7. A rear wheel steering device as recited in claim 6 wherein the cornering condition is changed based on vehicle speed in addition to the cornering condition related to rear wheel steering.

8. A rear wheel steering device as recited in claim 1 wherein the fail judge means is provided with first and second allowable steering ratio and vehicle speed zones for judging failure of the rear wheel steering device, the fail judge means judging a failure of the rear wheel steering device to be present when a rear wheel steering angle leaves the first allowable zone for a predetermined time period while judging the failure to be present as soon as the rear wheel steering angle leaves the second allowable zone, the second allowable zone being determined greater than the first allowable zone.

9. A rear wheel steering device as recited in claim 8 wherein the cornering condition is changed based on vehicle speed in addition to the cornering condition related to rear wheel steering.

10. A rear wheel steering device as recited in claim 1 wherein the criterion is changed based on vehicle speed in addition to the cornering condition detected by said cornering condition detecting means.

11. A rear wheel steering device as recited in claim 1 wherein the cornering condition detecting means detects the transitional cornering condition when a steering speed of a steering wheel is no less than a predetermined value.

* * * * *